Sept. 21, 1971　　　E. B. WILDHABER　　　3,606,768
PARALLEL SHAFT COUPLING
Filed Nov. 26, 1969　　　　　　　　　　　　4 Sheets-Sheet 1
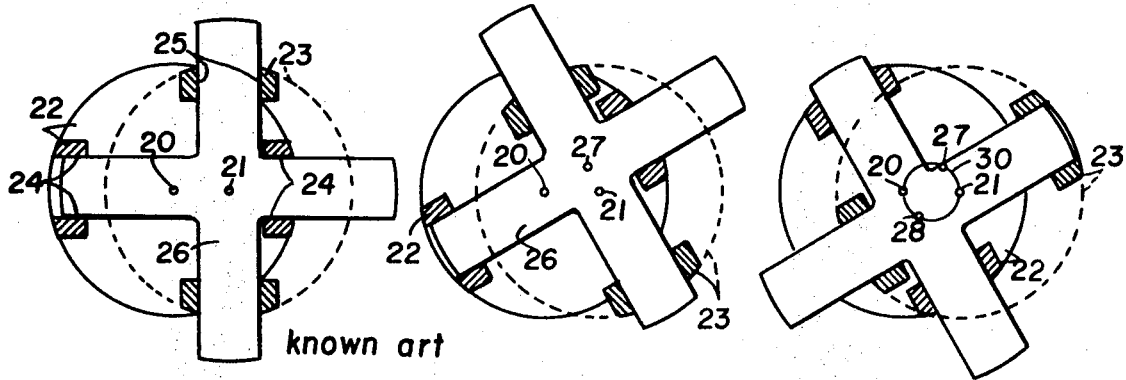
FIG. 1　　　FIG. 2　　　FIG. 3
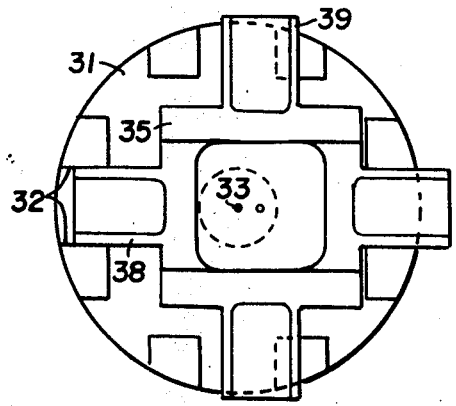 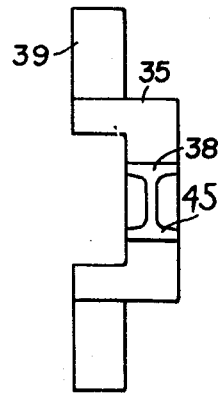 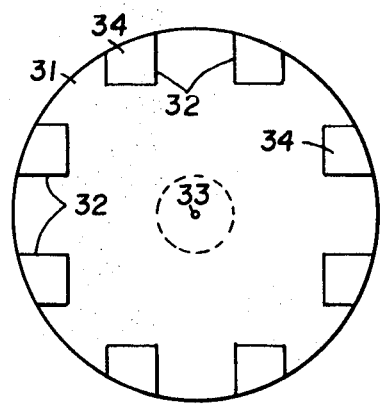
FIG. 5　　　FIG. 6　　　FIG. 4
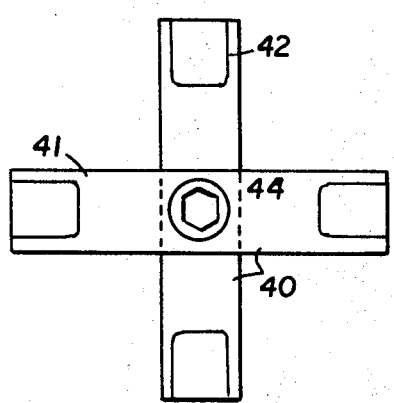 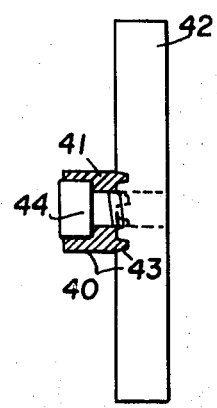 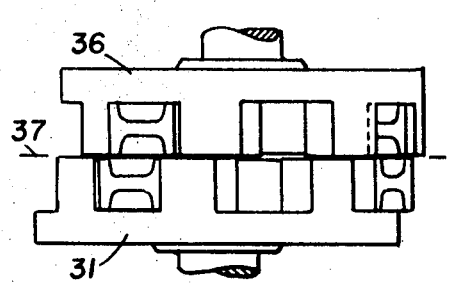
FIG. 7　　　FIG. 8　　　FIG. 9
INVENTOR:
Ernest Wildhaber Sept. 21, 1971   E. B. WILDHABER   3,606,768
PARALLEL SHAFT COUPLING Filed Nov. 26, 1969   4 Sheets-Sheet 2

INVENTOR:
Ernest Wildhaber

INVENTOR:

Ernest Wildhaber

Sept. 21, 1971   E. B. WILDHABER   3,606,768
PARALLEL SHAFT COUPLING
Filed Nov. 26, 1969   4 Sheets-Sheet 4

INVENTOR:
Ernest Wildhaber

United States Patent Office 3,606,768
Patented Sept. 21, 1971

3,606,768
PARALLEL SHAFT COUPLING
Ernest Wildhaber, Brighton, N.Y.
(124 Summit Drive, Rochester, N.Y. 14620)
Filed Nov. 26, 1969, Ser. No. 880,097
Int. Cl. F16d 3/24
U.S. Cl. 64—31
10 Claims

ABSTRACT OF THE DISCLOSURE

This coupling for parallel shafts comprises two coupling members rigid with said shafts and intermediate means for connecting them. Straight radial guideways are provided either on the coupling members or on the intermediate means. A single intermediate part working through said guideways causes dynamic unbalance. The invention provides two intermediate parts movable at right angles to each other on each coupling member, achieving mass-balance and increased load capacity. Friction is minimized with cylindrical rollers adapted to contact both sides of the guideways engaged thereby.

A prime object of the present invention is to provide a coupling for substantial changes in center distance between two coupled shafts, for adjustment at standstill or in motion, a coupling with moderate relative motion.

Further aims are to provide a coupling that can be readily moved through zero center distance, and one that does not turn when the center distance is changed. Also a coupling shall be devised that is dynamically balanced, and one that permits a slight angle between the nominally parallel coupling shafts.

A further object is a coupling for parallel shafts in which the working portions carry load without cyclic variations and load reversals.

An important other aim is to increase the load capacity of such a coupling.

A still further object is to devise a coupling where friction is minimized.

Other objects will appear in the course of the specification and in the recital of the appended claims.

These objects may be attained singly or in any combination.

Embodiments of the invention will be described with the drawings, in which:

FIGS. 1 to 3 are diagrams explanatory of a principle underlying the invention.

FIGS. 4 to 9 relate to one embodiment, wherein two slidable intermediate parts connect the two members of the coupling.

FIG. 4 is an axial view of one member of the coupling.

FIG. 5 is an axial view showing said one member in engagement with one of the two intermediate parts.

FIG. 6 is a side view of said one intermediate part.

FIG. 7 is an axial view of the other intermediate part of the coupling.

FIG. 8 is a side view thereof and partly a section through its center.

FIG. 9 is a side view of the assembled coupling, with the two parallel coupling axes in the plane of the drawing.

FIG. 10 is an axial view of a coupling member shown in engagement with one of the two intermediate parts.

FIG. 11 is a side view of said one part.

FIG. 12 is a side view of the other intermediate part.

FIG. 13 is a side view of this coupling.

FIG. 17 is an axial view of one coupling member and a cross-section taken along lines 17—17 of FIG. 21.

FIGS. 18 and 19 are side views of the two intermediate parts.

FIG. 20 is a view axially of the coupling and a section taken along lines 20—20 of FIG. 21.

FIG. 21 is a side view of this coupling.

FIG. 22 is a side view of one of the two equal coupling members and a sectional view showing a roller carried thereon.

Figure 9A:
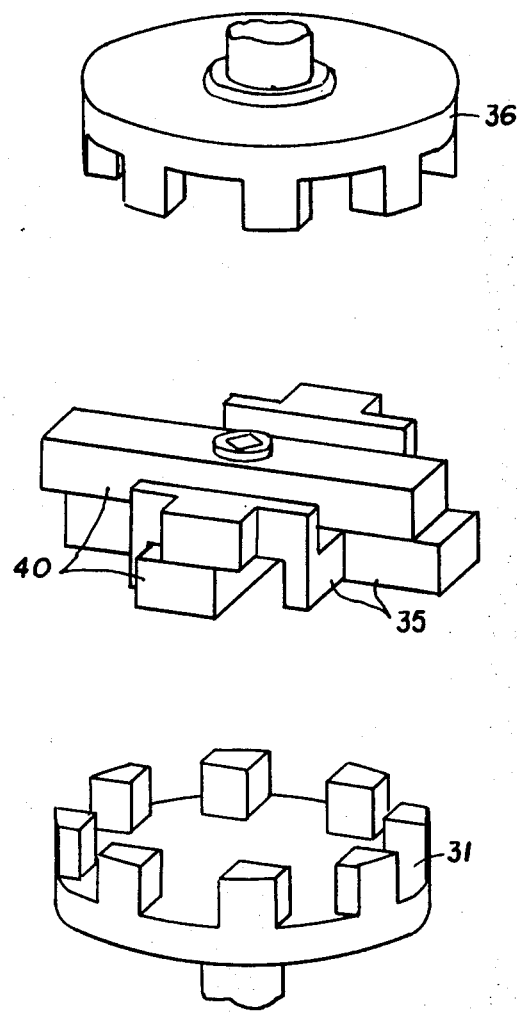
FIG. 9a is an exploded perspective view of the coupling shown in FIG. 9, with the two intermediate parts 35, 40 slightly simplified.

FIG. 1 shows a known way of transmitting uniform motion from a shaft centered at 20 to a shaft centered at 21. Heads 22, 23 of the shafts 20, 21 contain radial guideways 24, 25 at right angles to each other. They overlap axially. An intermediate part 26, formed like a cross, is slidable along the ways 24 and 25 and transmits identical turning motion from one shaft to the other.

FIG. 2 shows a different turning position. The center of the cross is then at 27. After turning through a right angle from this position the cross center is at 28, FIG. 3. As the coupling turns the cross center describes a circle 30 whose diameter equals the distance between turning centers 20, 21. The cross center moves on circle 30 at twice the rotational speed of the coupling.

The intermediate part 26 thus is subjected to centrifugal inertia load that becomes objectionable at any but really small distances of the axes 20, 21; also at high speeds and especially at a combination of both.

The inertia load is the product of the square of the angular velocity of the coupling, of double the center distance 20-21, and of the mass of the intermediate part, as can be demonstrated.

The invention provides mass-balance by using two intermediate parts in opposite positions, one centered at 27 and the other centered at 28 (FIG. 3) at the same turning position of the coupling. As the coupling rotates these centers move on circle 30 always in diametrically opposite positions. In addition the load capacity of the coupling is increased by the double number of working contacts.

FIG. 4 shows a coupling member 31 of the embodiment to be described with FIGS. 4 to 9. Instead of having only two diametrically opposite straight radial ways, it has four straight radial ways 32. They are equally spaced about axis 33 and are formed on projections 34 of the coupling-member body. The other coupling member may be made exactly like member 31.

FIG. 5 shows coupling member 31 in engagement with one of the two intermediate parts. Part 35 engages the horizontal ways 32 of coupling member 31 and the vertical ways of the mating coupling member. The two coupling members 31, 36 (FIG. 9) extend entirely on opposite sides of mid-plane 37. Accordingly the arms and working portions 38, 39 of part 35 are at different levels axially of the coupling. The portions 39 are raised axially above the portion 38, as clearly seen in the side view, FIG. 6.

The other intermediate part 40 is shown in FIGS. 7 and 8. It is in the form of a cross, comprising horizontal bar 41 shown on top of vertical bar 42, at different levels axially of the coupling. The arms of bar 41 engage the horizontal guideways of coupling member 36, while the arms of bar 42 engage the vertical ways 32 of coupling member 31. The bars 41, 42 are rigidly secured to each other. The connection may be by means of teeth 43 (FIG. 8) and a screw 44 that keeps them in engagement.

If desired, a permanent connection of the bars 41, 42 through brazing or welding may be used, to permanently enclose the other intermediate part 35.

The two intermediate parts 35, 40 are preferably made of the same weight, strength and resilience. An I-beam section 45 may be used on the arms 38, 39 of part 35, partly to equalize the weight of the intermediate parts.

A side view of the assembled coupling is afforded by FIG. 9. Some axial clearance is introduced between the coupling members and the intermediate parts if the coupling is to permit also a slight shaft angularity.

ANTIFRICTION EMBODIMENT

An antifriction embodiment will now be described with FIGS. 10 to 13.

Figure 10:
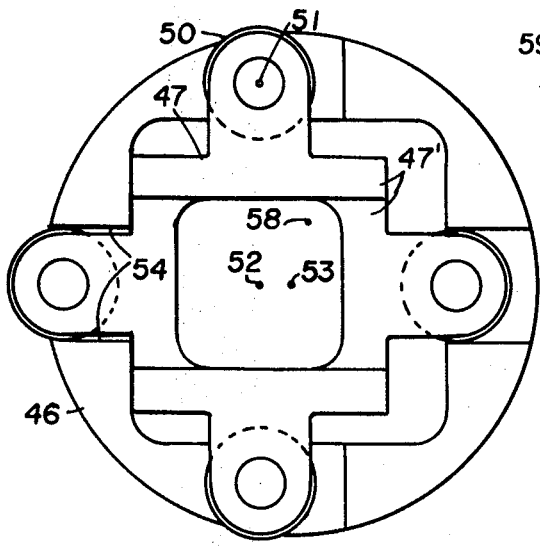
FIGS. 10 to 13 illustrate a further embodiment of the invention. It uses rollers to minimize friction.

FIG. 10 is an axial view similar to FIG. 5, showing one coupling member 46 and one of the two intermediate parts 47, 48. Part 47 contains four rollers 50, with axes 51 parallel to the coupling axes 52, 53. The rollers are adapted to contact both sides of their guideways 54. The rollers of part 47 engage the horizontal guideways (FIG. 10), of coupling member 46 and the vertical guideway of coupling member 56 at a different level axially of the coupling.

Figure 11:
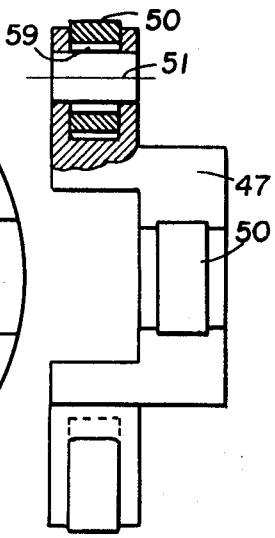
Figure 12:
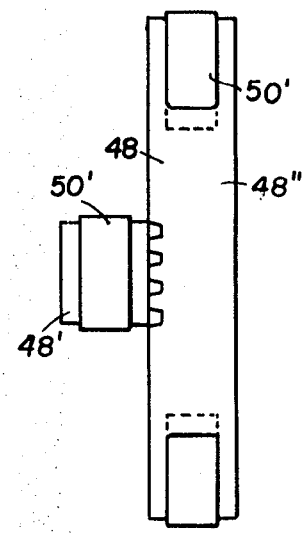
Figure 13:
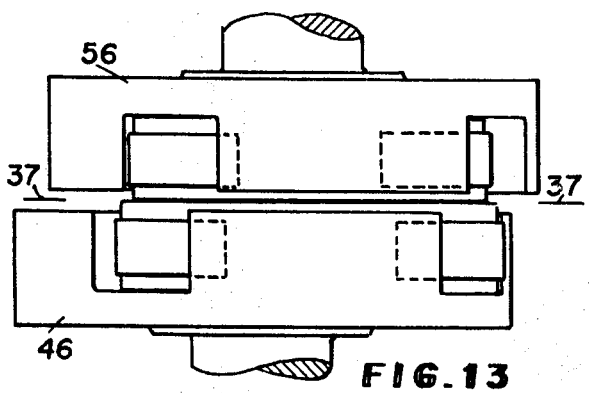

FIG. 11 is a side view of intermediate part 47. FIG. 12 shows intermediate part 48. It is made up of two bars 48', 48'' rigidly secured together. The four rollers 50' of part 48 engage the vertical guideways of coupling member 46 and the horizontal guideways of coupling member 56. A side view of the coupling is afforded by FIG. 13. Here also the two coupling members 46, 56 extend entirely on opposite sides of mid-plane 37. Also the body 47' of intermediate part 47 has a central opening 58 partially filled by intermediate part 48. The opening is preferably square and may have rounded corners. The rollers 50, or broadly the working portions, are disposed outwardly of body 47'. The rollers may be mounted on needle bearings 59 (FIG. 11).

Figure 14:
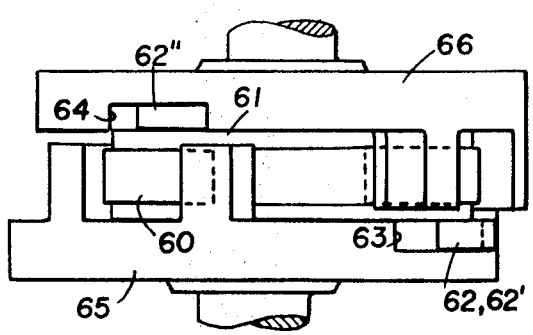
FIG. 14 is a side view of a further modified coupling embodiment.
Figure 15:
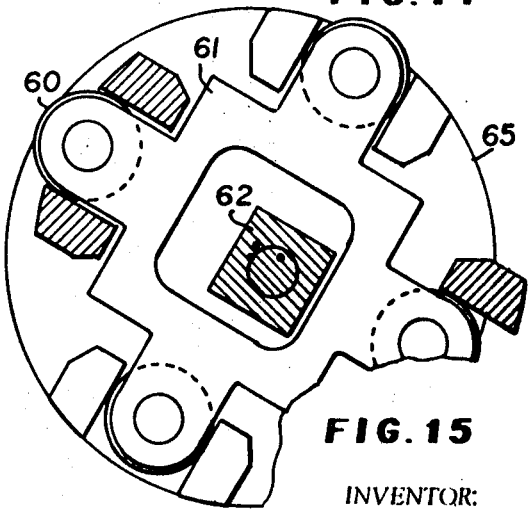
FIG. 15 is a cross-section thereof taken along the top of intermediate part 61, looking down.
Figure 17:
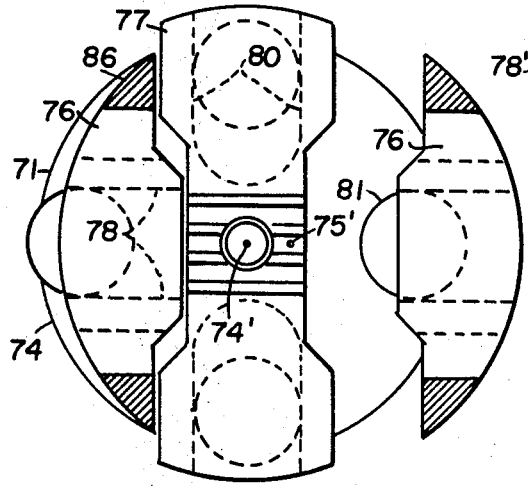
FIG. 17 to 22 illustrate a similar embodiment designed for increased center distance.
Figure 18:
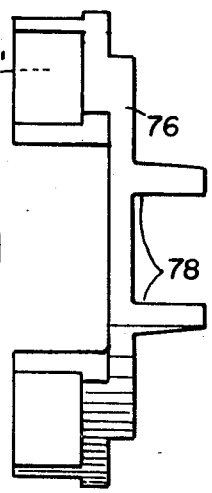
Figure 19:
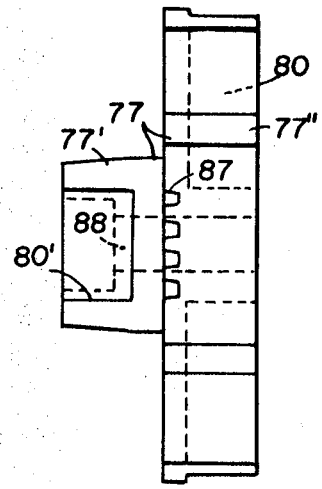
Figure 20:
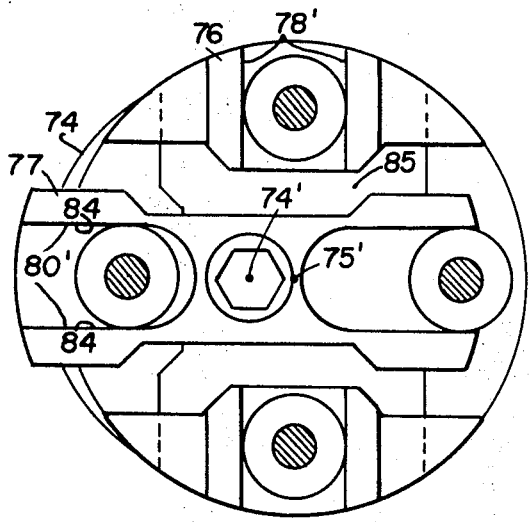
Figure 21:
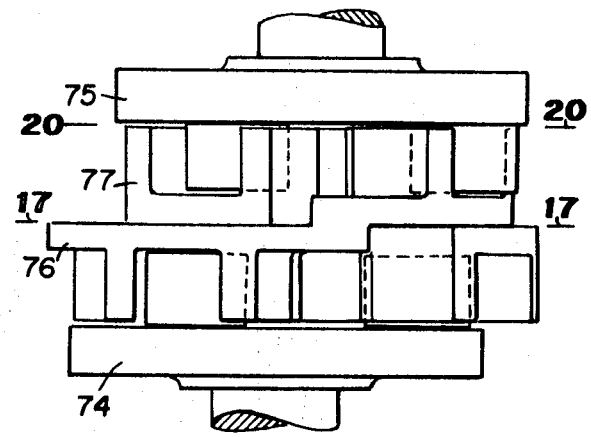
Figure 22:
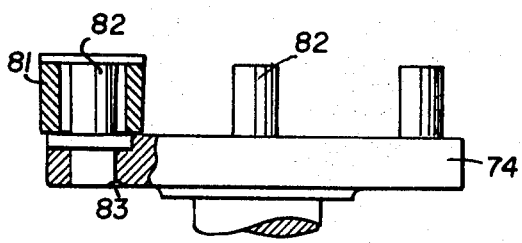

FIGS. 14 and 15 illustrate a coupling in which the rollers 60 of intermediate part 61 are all on the same level axially of the coupling. Here the other intermediate part 62 serves only for mass balance. It does not carry much load and contains no rollers. Some backlash is introduced to keep it idling. It comprises two bar-like portions 62', 62'' on opposite sides of part 61. They slide in shallow guideways 63, 64 provided in the coupling members 65, 66 respectively. The two portions have projections that reach through the central opening provided in part 61 and that are rigidly secured together. The two intermediate parts 61, 62 should have equal weight for mass-balance.

Figure 16:
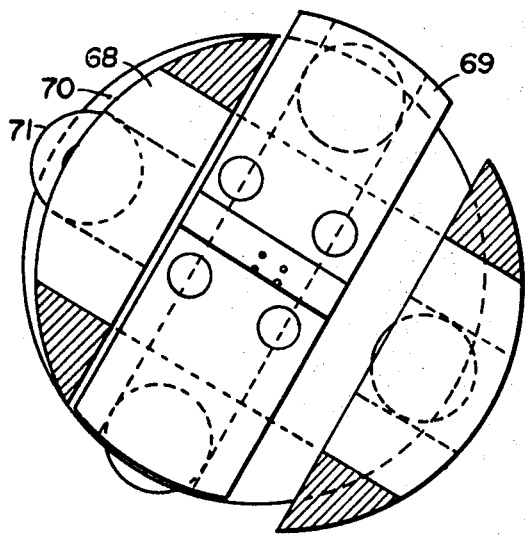
FIG. 16 is an axial view and cross-section of a still other modification. It shows one coupling member in engagement with portions of the two intermediate parts, which here contain the guideways.

In the embodiment shown in FIG. 16 the rollers rae provided on the coupling members, which are both alike. The rollers engage straight radial guideways of the two intermediate parts 68, 69. Coupling member 70 contains four equally spaced rollers 71. Two of these are engaged by intermediate part 68; the other two by intermediate part 69. The rollers of the other coupling member engage guideways provided on the opposite side of the intermediate parts. Intermediate part 69 is composed of two component parts rigidly secured together at the central opening of part 68.

In the embodiment to be described with FIGS. 17 to 22 the intermediate part 77 has a reduced width at its central portion, to permit increased shaft distances. It is shown at a maximum shaft distance of 10% of the outside diameter of the coupling members 74, 75, whose axes are at 74', 75'. It permits one coupling shaft to move between equal positions on opposites sides of the other coupling shaft, a displacement up to 20% of said outside diameter. The shaft displacement can be effected directly, without loosening any bolts, by simply displacing one shaft or the slide on which said shaft is mounted. The displacement can be a feed motion, if desired.

The two coupling members 74, 75 are equal and lie entirely on opposite sides of a mid-plane perpendicular to their axes. They are separated by portions of the intermediate parts 76, 77. Part 76 contains two radial ways 78 on one level and two radial ways at right angles thereto on another level axially of the coupling. Part 77 contains two radial ways 80 on the level of the ways 78 and two radial ways 80' on the level of ways 78'. The ways 78, 80 engage the four equally spaced rollers 81 of coupling members 74, while the ways 78', 80' engage the four rollers of coupling member 75. The rollers 81 (FIG. 22) may be mounted by needle bearings on inserted bolts 82 secured to member 74 by a press fit and spot welding at 83. Their axes are parallel to the axis of their coupling member. The rollers are adapted to engage alternately both parallel plane sides 84 of their ways, depending on the direction of the driving load.

Part 76 has a central opening 85 (FIG. 20) formed by two portions of different axial levels. The two portions are integral with each other and cohere at four areas 86 (FIG. 17) at their periphery. Part 77 is made up of two component parts 77', 77'' that are rigidly secured together, as by teeth 87 and a screw 88 keeping teeth 87 in engagement on both sides. The connection of the components 77', 77'' is effected inside of opening 85.

In all described embodiments no relative turning displacement is incurred by a change of center distance. Equal uniform motion is transmitted at all time. Also each working portion or roller carries its load continuously, without cyclic variations with each turn.

In all embodiments the intermediate parts are confined to translation along straight radial lines with respect to the coupling members. The coupling members and intermediate parts remain always in the same angular position relative to each other.

I claim:

1. A coupling comprising two members to be coupled and two intermediate parts,
    means for confining each of said parts to translation along a straight radial line relatively to one of said members, and along a straight radial line at an angle to the first-named line with respect to the other member,
    said two parts being movable with respect to each of said members at an angle to each other,
    both of said angles being preferably right angles.

2. A coupling according to claim 1, wherein at least one of said intermediate parts has working portions at two different levels axially of the coupling, for engagement respectively with the two members of the coupling.

3. A coupling according to claim 1, wherein both intermediate parts have working portions at different levels axially of the coupling,
    the two members to be coupled extend entirely on opposite sides of a mid-plane perpendicular to the coupling axes.

4. A coupling according to claim 1, wherein one intermediate part has a central opening.

5. A coupling according to claim 4, wherein said opening is square.

6. A coupling according to claim 1, wherein one intermediate part is made up of two components rigidly secured together,
    said two components contain working portions engaging the two coupling members respectively at different levels axially of the coupling.

7. A coupling according to claim 1, wherein each of the two coupling members contains four straight guideways having opposite plane sides facing each other.

8. A coupling according to claim 1, wherein each of the two intermediate parts contains four straight guideways having opposite plane sides facing each other.

9. A coupling according to claim 1, wherein said intermediate parts carry rollers for engagement with straight guideways provided on said two coupling members,
- the axes of said rollers are parallel to the coupling axes at least approximately,
- each roller is adapted to engage both sides of its guideway.

10. A coupling according to claim 1, wherein each of said coupling members carries four rollers rotatably mounted thereon,
- the axes of said rollers are parallel to the coupling axes,
- said intermediate parts contain straight radial guideways for engagement with said rollers,
- each roller is adapted to engage both sides of its guideway.

References Cited

| | | | |
|---|---|---|---|
| 758,383 | 5/1954 | Great Britain | 64—31 |
| 524,760 | 4/1930 | Germany | 64—31 |

MARK M. NEWMAN, Primary Examiner

R. HEALD, Assistant Examiner